Sept. 10, 1963  P. SHEVICK  3,103,588
RADIOACTIVITY SOURCE-AND-DETECTOR PROBE
Filed June 11, 1958
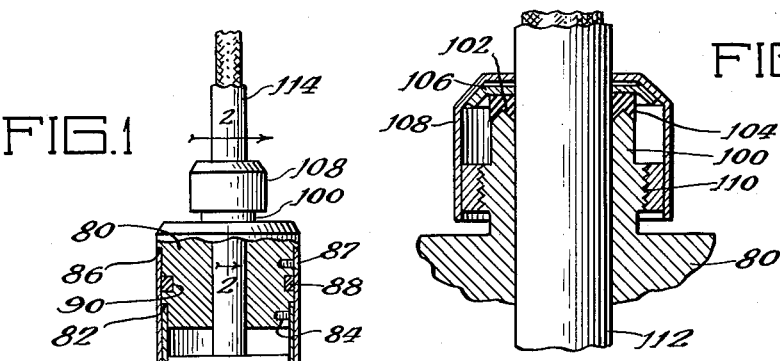
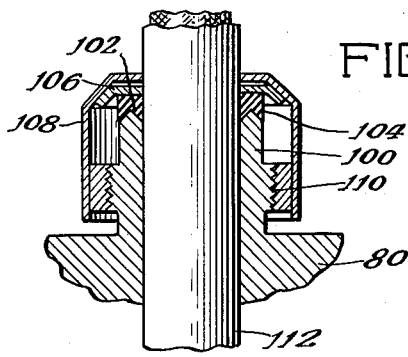
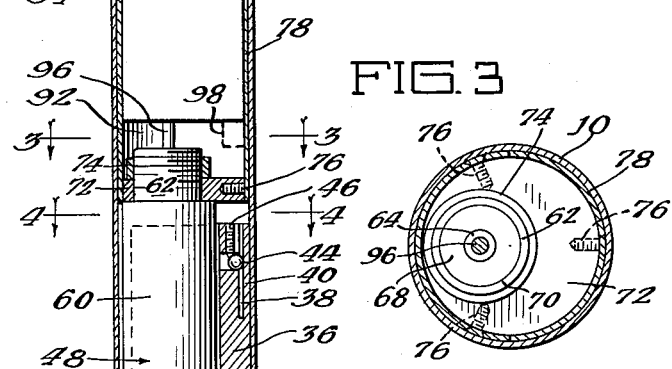
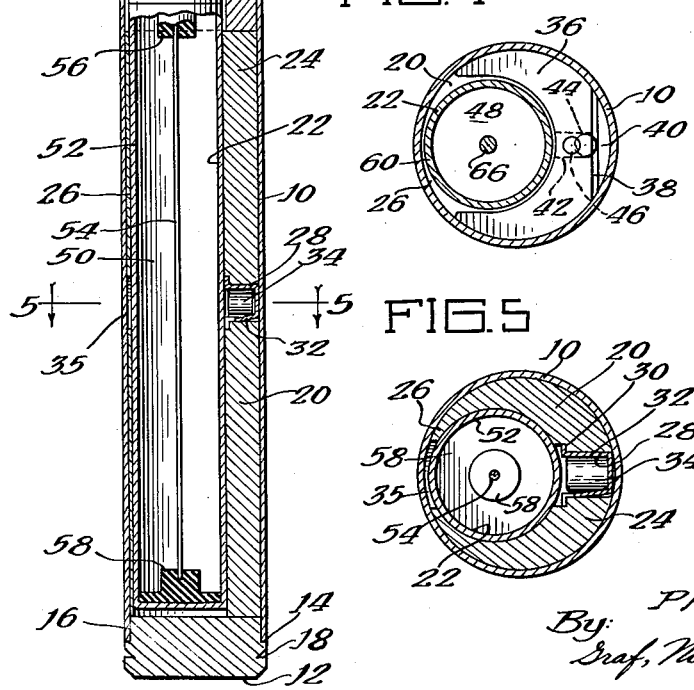
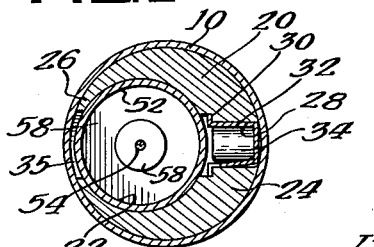
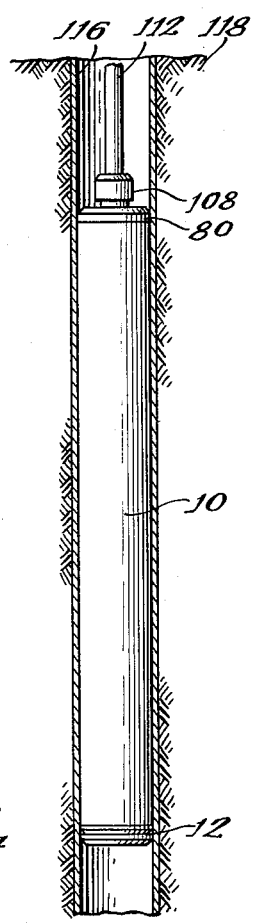
Inventor:
Philip Shevick
By Graf, Nieman & Burmeister
Attorneys

Patent 3,103,588 — Radioactivity Source-and-Detector Probe

3,103,588
RADIOACTIVITY SOURCE-AND-DETECTOR PROBE
Philip Shevick, Chicago, Ill., assignor to Nuclear-Chicago Corporation, Chicago, Ill., a corporation of Delaware
Filed June 11, 1958, Ser. No. 741,421
5 Claims. (Cl. 250—83.6)

This invention relates to an improvement in devices employing radioactivity for measurement of characteristics of materials, and more specifically to a novel construction of a source-and-detector probe for insertion into media whose characteristics are under measurement.

One important manner of performing various types of measurements of characteristics of materials is the employment of a radioactivity source and a radioactivity detector so relatively positioned with respect to the material or medium under measurement that the response of the detector is an indication of the characteristics of the material. Such devices are found to be of utility in a large variety of applications, and employ various constructions and various detailed principles of operation. The present invention is concerned with the type of device where the source and the detector are incorporated in a single assembly, commonly called a "probe." More specifically, the present invention is concerned with the type of probe in which the detector is insensitive to direct radiations from the source, the response of the detector to emanations from the source being dependent upon change in the character or nature of the radiations effected in the surrounding medium. In the present instance, the source employed is a source of unmoderated neutrons, the detector employed being sensitive only to slow neutrons, and the moderation of the neutrons being accomplished in the surrounding medium whose characteristics are under measurement.

The probe presently to be described is specifically designed for the measurement of moisture content of soil. The use of a fast neutron source with a slow neutron detector in measurement of the moisture content of soil has been the subject of numerous investigations and experiments by various workers in recent years. It has been shown to be highly feasible to make accurate measurements of soil moisture employing this technique. In one commonly used way of making such measurements, the probe, containing the fast neutron source and the slow neutron detector, is lowered into a suitable pipe or tube driven into the soil under measurement, thus enabling measurement of the soil moisture at various depths, such a type of probe being known as a "depth probe." In general, the depth probes heretofore devised more or less resemble the analogous devices employed in geophysical borehole prospecting for oil and similar purposes. Such probes heretofore devised, however, are not found to be suitable for widespread production and use in such varied applications as agricultural research, road-building, and similar uses where the instrument must be capable of being handled by relatively inexperienced personnel with relative ease in order to achieve acceptance.

Accordingly, it is the principal object of the present invention to provide a soil moisture probe capable of simple industrial manufacture and also of accurate and reliable measurements by inexperienced personnel, with dangers due to the presence of radioactivity minimized. In the provision of such a probe, it becomes important to maximize the efficiency of the device, i.e., to obtain the maximum counting rate of the detector, and change of counting rate with moisture, that is obtainable for a neutron source of any given size. Further, it is desirable, for widespread use by inexperienced personnel, that such an instrument have a calibration which is linear over the soil moisture range of interest, i.e., in which the soil moisture content is a linear function of the counting rate produced in the detector. Further, the device must be of minimum size, in order not only to provide portability, but also to permit insertion of the probe into a pipe or tube of relatively small diameter, since the necessity of making boreholes of adequate size to pass the relatively large probes heretofore employed is virtually prohibitive as regards routine use of such instruments. A further problem which exists for such purposes is the necessity of providing structure for shielding the top of the borehole from gamma rays which are emitted where radium-beryllium is employed (as is fairly common) as the neutron source. By the same token, where the source is to be drawn into a vertically apertured shield when withdrawn from the borehole, the shielding of gamma rays must also be incorporated at the lower end of the probe in order to avoid the necessity of employing a bottom cap or shield when the probe is withdrawn into the above-ground shield.

The manner in which these problems are solved by the present invention will best be understood by reference to the embodiment of the invention illustrated in the attached drawing, in which:

FIGURE 1 is a view in vertical section of a probe made in accordance with the invention;
FIGURE 2 is an enlarged sectional view taken along the line 2—2 of FIGURE 1;
FIGURE 3 is an enlarged sectional view taken along the line 3—3 of FIGURE 1;
FIGURE 4 is an enlarged sectional view taken along the line 4—4 of FIGURE 1;
FIGURE 5 is an enlarged sectional view taken along the line 5—5 of FIGURE 1; and
FIGURE 6 is a view illustrating the manner of use of the probe, showing the probe supported by its cable in a pipe or tube lining a hole bored in the earth or other material whose moisture content is to be measured.

As shown in the drawing, the main body or housing of the probe constitutes an elongated tube 10 of a suitable material such as brass of .025 inch thickness, the outer diameter being, for example, 1½ inches. At the lower end is a cap 12, also of brass, formed with a shoulder 14 seated against the lower end of the tube 10, and permanently fastened to the tube 10 by soldering at the interface 16. A circumferential groove 18 in the cap 12 permits latching of the probe into its above-ground shield (not illustrated). Resting on the cap 12 within the housing is a lead shield 20 having a longitudinal aperture 22 eccentrically disposed with respect to the axis of the housing, thus making the shield 20 substantially crescent-shaped, with a thick portion 24 at one circumferential point and an extremely thin portion 26 diametrically opposite, the thin portion 26 being provided primarily to give mechanical rigidity to the shield 20. The thick portion 24 of the shield 20 has a radial aperture 28, the inner portion of which has a shoulder 30, upon which is seated the flange or lip of a flanged cup or clip 32 formed of resilient material and holding a neutron source 34, which is a small cylinder of a suitable container material, such as stainless steel, enclosing intermixed radium and beryllium. An aperture 35 in the thin portion 26 permits installation of the source 34 in the opposite wall of the shield as shown.

Above the shield 20 is a locking member or retaining ring 36 fabricated from a material such as aluminum rod and having a crescent-shaped cross-section similar to that of the shield 20, except that the thin side is omitted entirely. The upper end of the locking member 36 has a vertical slot 38 extending across a chord of the member 36 to a depth sufficient to form a tab portion 40. A radial bore 42 extends between the slot 38 and the main opening in the locking member and a ball 44 is seated in this bore. A pointed setscrew 46 extends down to this bore from the upper end of the locking member, the lower end contacting the ball 44. It will be seen that tightening of the screw 46 causes the ball 44 to exert pressure on the tab 40, thus securely locking the shield 20 and the retaining ring or locking member 36 in position within the housing.

Seated within, and extending throughout the length of, the continuous aperture formed by the aligned eccentric apertures in the shield 20 and locking member 36 is a cylindrical neutron detector generally indicated by the numeral 48. The neutron detector illustrated is a proportional counter of a type which is conventional and generally available. The lower end of the counter comprises a gas-filled counter volume 50 having a wall 52 serving as the cathode and a center anode wire 54 supported by an upper insulator 56 and a lower insulator 58. The gas within the counter volume 50 may be boron trifluoride. As will be further discussed below, although the neutron counter is conventional in construction, the sensitive length of the counter, i.e., the portion of the length of the counter which will respond to neutrons traversing it, must be carefully chosen in the present construction. Further, the relative disposition of the sensitive portion of the length of the counter and the neutron source must be such that the neutron source is substantially at the longitudinal center of the sensitive portion of the counter. In the embodiment shown, the sensitive portion of the counter is defined by the length of the center wire 54 between the insulators 56 and 58; as is well known, the ion multiplication, which is typical of proportional counter action, is not produced in longitudinal portions of the counter where the center wire is covered by insulation of substantial thickness.

Assembled as a unit with the active counter volume 50 is a connector-mounting portion 60 of the counter 48, at the top end of which is a coaxial connector fitting 62 having a conventional central female electrode 64 connected by a wire connecting lead 66 to the center wire 54. The details of construction of the connector-mounting portion 60 and the connector 62 are not illustrated in the drawing, the entire neutron counter being of a conventional commercially available type, as previously mentioned. The connector 62 has, as is conventional, an insulator 68 separating the central conductor 64 from an externally threaded shell 70.

The externally threaded shell 70 of the connector 62 passes through an eccentrically apertured disc 72, and a nut 74 secures the neutron counter 48 to the disc. Radially extending screws 76 secure the disc in the lower end of a tube 78 (which may be formed in two semi-cylindrical portions to permit access to the interior thereof). In the top of the tube 78 is the lower end of a cap 80 formed with a shoulder 82 seated on the upper end of the tube 78. The cap 80 is secured to the tube 78 by radially extending screws 84. A further shoulder 86 on the cap 80 is seated on the upper end of the outer tube or housing 10 and is secured thereto by radially extending screws 87. An O-ring 88 is seated in a groove or seat 90 formed in the cap 80 to form a waterproof seal for the entire interior of the probe.

The interior of the tube 78 constitutes a housing 92, for a preamplifier 94 shown merely as a block element in the drawing. The preamplifier 94 is preferably a transistorized amplifier employing suitable feedback for stability, and having an appropriate frequency response to transmit pulses from the proportional counter with maximum efficiency. The preamplifier 94 is coupled to the proportional counter by a pin lead 96 plugged into the central conductor 64 of the coaxial connector 62, the preamplifier being grounded to the shell or housing 10 as shown by the highly schematic dotted connection 98.

On the upper end of the cap 80 is formed a centrally apertured boss 100 provided with a bevel 102 on which is seated a rubber sleeve 104, on top of which is a washer 106. An apertured cap 108 is threadedly engaged with the boss 100 at 110. A coaxial cable 112, containing appropriate leads for powering the preamplifier and proportional counter, and also for transmitting the pulse signals from the preamplifier, extends out through the central aperture in the cap 100 through the waterproof seal formed by compression of the sleeve 104 against the insulating sheathing of cable 114.

As shown in FIGURE 6, the probe is designed for use in a pipe or tube 116 driven into the earth 118, the internal diameter of the tube 116 being as small as 1½ inches, as previously pointed out.

Features of construction visible in the drawing having been described, it is now desirable to discuss the purposes and advantages of the various features of construction, and to further discuss the criticality of selection of the various parameters involved for the purpose of securing optimum performance.

When employed for the measurement of moisture content in soil, the illustrated probe produces a monotonic calibration curve, the counting rate of the proportional counter being an increasing function of soil moisture content. The calibration curve, when the parameters are properly selected, as discussed below, is essentially linear in the region from zero percent to fifty percent moisture content, the latter being the region of maximum moisture content of interest in soil moisture measurements normally made. To date no complete theoretical analysis has been made sufficient to permit accurate prediction of the shape of the curve which will be obtained with any particular choice of parameters, or of the optimum parameters to be chosen, but the general theory can be set forth.

The alpha-activated beryllium source emits a completely negligible number of thermal neutrons so that all events detected by the counter are due to the moderated fast neutrons which are scattered back to the detector with sufficiently low energy to be detected. Neutron diffusion theory indicates that the number of detected neutrons is determined by the source strength, the mean lifetime of the neutrons in the scattering medium, the slowing down length of the neutrons in the medium, and the diffusion length of slow neutrons in the medium. The spatial distribution of neutrons in the medium depends primarily on the moisture content because the energy loss is primarily due to scattering by hydrogen nuclei, which on the average results in a neutron energy loss of one-half in each scattering collision. This energy reduction is many times greater than that produced by any other element. It is of course true that some variation in reproducibility of results, as regards moisture measurement, may be produced by variation in hydrogen content of soils under measurement due to factors other than the presence of moisture, such as in organic hydrogen compounds. However, experiment demonstrates that the chemical bonding of the hydrogen in such organic compounds is such as to effectively reduce the scattering cross-section of the hydrogen in such form, as opposed to hydrogen in the form of water, thus making variations in the dry state hydrogen content of soils usually encountered a relatively inconsequential influence on the accuracy of the moisture or free water content of the soil. Another theoretical factor leading to spurious results is variation of the content of neutron-absorbing substances other than hydrogen. Again, experiment indicates that elements which have a high capture cross-section for neutrons, such as chlorine, manganese, boron, cadmium, and lithium, appear only in trace amounts in normal soils, so that this factor likewise does not disturb the accuracy of measurements to an appreciable degree. It is found that despite large variations in grain, structure, and aggregation of different soil types, the elemental composition of various soil types is fairly constant, so that the neutron count produced by the proportional counter is a reliable indicator of moisture content of the surrounding soil in all soils normally encountered.

As previously pointed out, linearity and sensitivity of measurement are both important in an instrument for use by relatively untrained personnel. As regards linearity, the desirability of obtaining a calibration wherein all moisture contents within the range of interest may readily be obtained by applying a single multiple to the counting rate, with reasonable accuracy, is far preferable to an instrument having a non-linear calibration curve over the range of interest. As regards sensitivity, the minimizing of the required source strength is an obvious requirement in an instrument for routine field use because of the minimizing of radiation hazards. The maximizing of absolute counting rates and of the slope of the calibration curve is required in order to eliminate the necessity of taking extremely long measurements in order to eliminate the effect of statistical variations on the percentage accuracy.

The appropriate choice of parameters is extremely important in maximizing the linearity over the range of interest and the sensitivity and accuracy of the instrument. It is found that the orientation of the neutron source with respect to the counter, and the use of a neutron detector having a sensitive length properly correlated with the energy of the neutrons emitted by the source, are both extremely important. Further, it is found experimentally that these two factors are mutually interdependent in producing optimum results with any given neutron source. Increase of the length of the sensitive volume of the counter substantially beyond optimum will, of course, tend to increase the absolute counting rates obtained from any given soil moisture. However, it is found that increase substantially beyond optimum destroys both the linearity and the desired large slope of the calibration curve in the region from zero to fifty percent moisture content which is of interest in most measurements. Decreasing the effective counter length substantially below optimum decreases the absolute counting rate obtained with any given size source without producing any concomitant benefit in linearity or slope. As regards positioning of the source, it is found experimentally that where the sensitive length of the detector is substantially larger than the diameter, the optimum positioning of the source is midway of the length of the detector.

Employing a radium-beryllium mixture as the neutron source, with the source at the longitudinal midpoint of the detector, it is found that the optimum results, as above defined, are obtained with an effective or sensitive detector length of from five to seven inches with boron as the detecting element in the detector.

In one embodiment of the invention there was employed a boron trifluoride neutron proportional counter having a sensitive length of five and one-half inches and a thermal neutron efficiency of approximately one percent. The source employed was a five milligram radium-beryllium capsule producing a total neutron flux of $6.5 \times 10^4$ neutrons per second. The probe so constructed was sufficiently sensitive to produce linear indications of soil moisture content over a range of from zero to fifty percent with an accuracy of plus or minus two percent in a large variety of soils, checking of accuracy being made by employment of core samples and conventional laboratory methods of soil moisture analysis. Such measurements require actual counting intervals of only from two to three minutes each.

It will be noted that the employment of lead above and below the source minimizes the radiation hazard from the source in the embodiment illustrated and described. The radium-beryllium source employed emits, in addition to the neutrons employed in the measurement, substantial quantities of gamma rays from the radium component. The lead above the source prevents the existence of a beam of gamma rays directly up the tube in which the measurements are being taken. The lead below the source prevents the existence of a strong downward beam of gamma rays when the probe is drawn up into an aboveground shield in which it is carried from place to place.

It will also be seen that with the illustrated construction, wherein the entire assembly is incorporated in a single elongated main housing and there are provided fastening means directly securing the counter to the preamplifier housing and the preamplifier housing to the top cap of the main housing, the entire portion of the probe which may require servicing is readily removable as a unit from the portion containing the source.

Variations in the described embodiment of the invention will readily be made by persons skilled in the art without departing from the basic teachings of the invention. Accordingly, the scope of the invention should not be taken to be limited by the particular embodiment illustrated, but is defined in the appended claims.

What is claimed is:

1. A source-and-detector probe for the measurement of moisture content and analogous properties in soil comprising an elongated circular cylindrical housing permeable to neutrons in all direction, an elongated circular cylindrical boron trifluoride neutron counter having a sensitive length between 5 and 7 inches eccentrically within the housing to form a substantially crescent-shaped annulus between the counter and the housing, lead gamma-ray shield substantially filling the crescent-shaped annulus, and radium-beryllium neutron source in the thickest portion of the shield substantially at the longitudinal center of the sensitive length of the counter.

2. A source-and-detector probe for the measurement of moisture content and analogous properties comprising an elongated boron trifluoride neutron counter having a sensitive length between 5 and 7 inches, a lead gamma-ray shield extending longitudinally along the wall of the counter, and a radium-beryllium neutron source in the shield substantially at the longitudinal center of the sensitive length of the counter and closely adjacent to the wall of the counter, the probe being free of substantially neuton-absorbing and substantially neutron-slowing materials in all surrounding directions along the entire sensitive length.

3. A source-and-detector probe for the measurement of moisture content and analogous properties comprising an elongated circular cylindrical housing permeable to neutrons in all directions, an elongated circular cylindrical slow neutron detector eccentrically within the housing to form a substantially crescent-shaped annulus between the detector and the housing a gamma-ray shield in the annulus, and a source of unmoderated neutrons and gamma-rays in the thickest portion of the shield substantially at the longitudinal center of the sensitive length of the detector.

4. A source-and-detector probe for the measurement of moisture content in coil comprising an elongated housing, a slow neutron detector having a sensitive length of between 5 and 7 inches within the housing, and a neutron source comprising alpha-activated beryllium substantially at the longitudinal center of the detector and closely adjacent to the wall of the detector, the probe being free of substantially neutron-absorbing and substantially neutron-slowing materials in all surrounding directions along said sensitive length.

5. A source-and-detector probe for the measurement of moisture content and analogous properties comprising an elongated slow neutron detector substantially insensitive to gamma rays, a source of gamma rays and unmoderated neutrons adjacent to the central longitudinal portion of the sensitive region of the detector, and a gamma-ray shield extending alongside the detector in both longitudinal directions from the source, the probe being free of substantially neutron-absorbing and substantially neutron-slowing materials in all surrounding directions along its length.

References Cited in the file of this patent

UNITED STATES PATENTS

| | | |
|---|---|---|
| 2,443,731 | Herzog | June 22, 1948 |
| 2,778,951 | Tittman | Jan. 22, 1957 |
| 2,781,453 | Belcher et al. | Feb. 12, 1957 |
| 2,944,148 | Johnson et al. | July 5, 1960 |